(12) United States Patent
Kumada et al.

(10) Patent No.: US 9,532,414 B2
(45) Date of Patent: Dec. 27, 2016

(54) LIGHTING DEVICE

(71) Applicant: Panasonic Corporation, Osaka (JP)

(72) Inventors: Kazuhiro Kumada, Hyogo (JP);
Masafumi Yamamoto, Hyogo (JP);
Yuji Yoshimoto, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/325,451

(22) Filed: Jul. 8, 2014

(65) Prior Publication Data

US 2015/0015162 A1     Jan. 15, 2015

(30) Foreign Application Priority Data

Jul. 9, 2013    (JP) ................................. 2013-143810

(51) Int. Cl.
*H05B 37/02* (2006.01)
*H05B 33/08* (2006.01)

(52) U.S. Cl.
CPC ...... *H05B 33/0815* (2013.01); *H05B 33/0818* (2013.01); *H05B 37/02* (2013.01); *Y02B 20/346* (2013.01)

(58) Field of Classification Search
CPC ............ H05B 33/0815; H05B 33/0818; H05B 33/0833; H05B 33/0839
See application file for complete search history.

(56) References Cited

U.S. PATENT DOCUMENTS

| | | | | |
|---|---|---|---|---|
| 8,604,707 | B2* | 12/2013 | Kumada | H02H 9/002 315/219 |
| 8,716,949 | B2* | 5/2014 | Watanabe | H05B 33/0815 315/224 |
| 2001/0030514 | A1* | 10/2001 | Takahashi | H05B 41/3921 315/219 |

(Continued)

FOREIGN PATENT DOCUMENTS

| | | |
|---|---|---|
| JP | 2009-054425 A | 3/2009 |
| JP | 2011-070957 A | 4/2011 |

(Continued)

OTHER PUBLICATIONS

German Office Action issued on Mar. 16, 2015 for corresponding German Patent Application No. 102014109506.5 and English translation.

*Primary Examiner* — Jason M Crawford
*Assistant Examiner* — Kurtis R Bahr
(74) *Attorney, Agent, or Firm* — Renner, Otto, Boisselle & Sklar, LLP

(57) ABSTRACT

A trigger-signal-output part sets a burst time cycle to a time period N (integer of two or more) times as long as a constant first cycle, and outputs a trigger signal M (positive integer of N or less) times during an operation period so as to synchronize it with the first cycle, and does not output the trigger signal during a stop period except the operation period of the burst time cycle. Alternatively, a trigger-signal-output part sets a burst time cycle to a time period N times as long as an output cycle of a trigger signal in an operation period, and sets the operation period to a time period M times as long as the output cycle, and sets a stop period except the operation period of the burst time cycle to a time period generated by multiplying the output cycle by a difference between N and M.

5 Claims, 5 Drawing Sheets

(56) References Cited

U.S. PATENT DOCUMENTS

| | | | |
|---|---|---|---|
| 2008/0043504 A1* | 2/2008 | Ye | H02M 3/33507 363/97 |
| 2008/0175029 A1* | 7/2008 | Jung | H02M 3/156 363/79 |
| 2009/0296387 A1* | 12/2009 | Reisenauer | F21V 3/00 362/235 |
| 2010/0156319 A1* | 6/2010 | Melanson | H05B 33/0839 315/297 |
| 2011/0095698 A1* | 4/2011 | Sasakawa | H05B 37/0227 315/287 |
| 2012/0262080 A1 | 10/2012 | Watanabe et al. | |
| 2012/0286686 A1 | 11/2012 | Watanabe et al. | |
| 2013/0049623 A1 | 2/2013 | Murakami | |
| 2013/0154497 A1* | 6/2013 | Yamamoto | H05B 33/0815 315/210 |
| 2013/0328497 A1 | 12/2013 | Nakada et al. | |
| 2014/0009077 A1* | 1/2014 | Yoshimoto | H05B 33/0845 315/210 |
| 2014/0028196 A1* | 1/2014 | Takikita | H05B 37/02 315/130 |
| 2014/0070721 A1 | 3/2014 | Naruo et al. | |

FOREIGN PATENT DOCUMENTS

| | | |
|---|---|---|
| JP | 2011-150878 A | 8/2011 |
| JP | 2012-204026 A | 10/2012 |
| JP | 2013/045753 A | 3/2013 |

\* cited by examiner

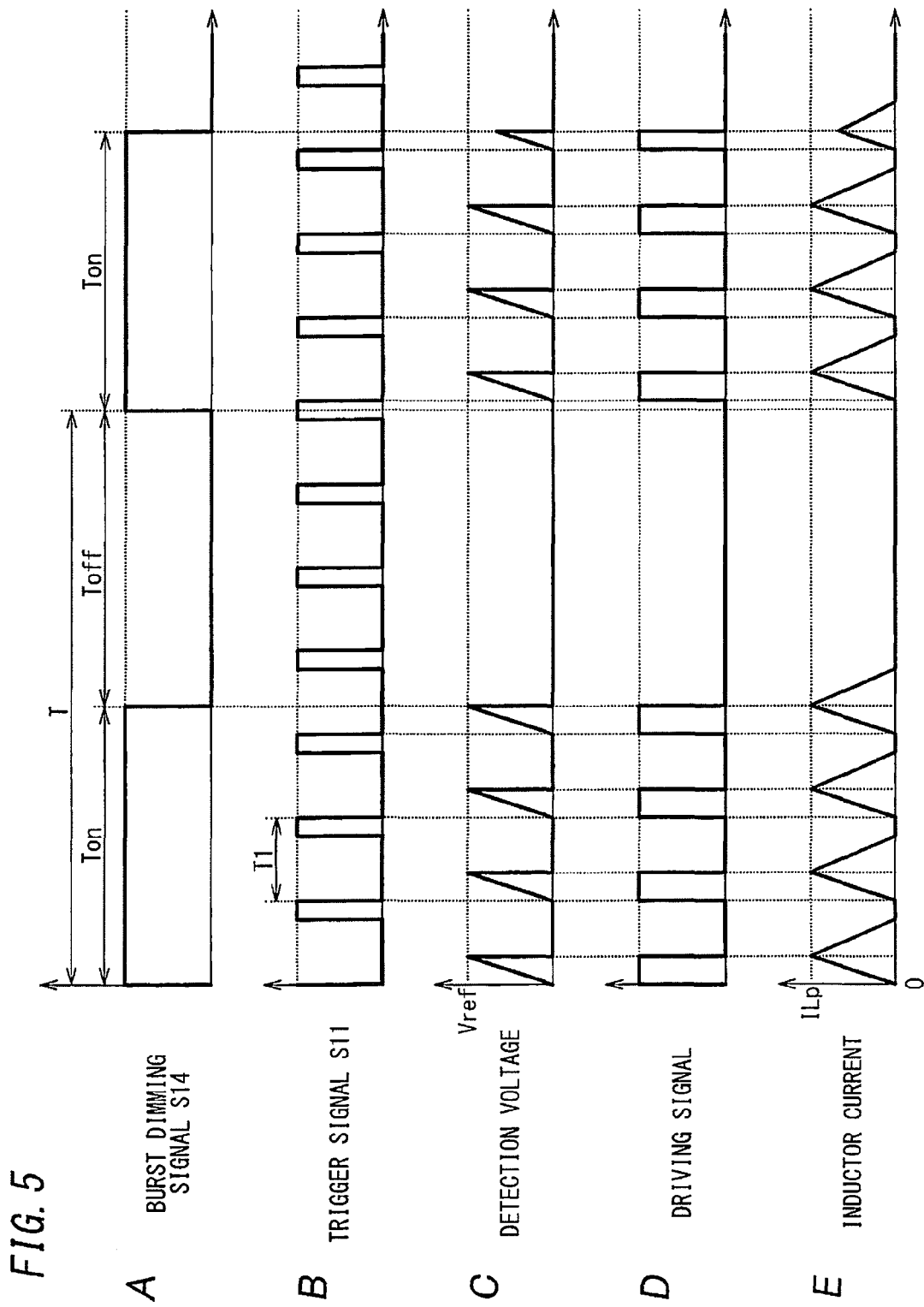

LIGHTING DEVICE

CROSS-REFERENCE TO RELATED APPLICATION

This application claims the benefit of priority of Japanese Patent Application Number 2013-143810, filed on Jul. 9, 2013, the entire contents of which are hereby incorporated by reference.

TECHNICAL FIELD

The present invention relates generally to lighting devices and, more particularly, to a lighting device including, as a light source, a solid light emitting element, such as a light emitting diode.

BACKGROUND ART

Recently, a solid light emitting element has been widespread as a light source for illumination instead of an incandescent lamp or a fluorescent lamp. The solid light emitting element is a light emitting diode, an organic electro luminescence (EL) element, or the like. For example, JP 2012-204026 A (hereinafter referred to as "document 1") discloses, as a lighting device for turning on a light source constituted of a light emitting diode (LED), a lighting device (a solid light source lighting device) that is configured to adjust (dim) light intensity of an LED depending on a dimming signal received from a dimmer.

Incidentally, examples of a dimming processing for an LED include a dimming processing (hereinafter referred to as a "DC dimming processing") for changing the amount of a current continuously flowing through an LED and a processing (hereinafter referred to as a "burst dimming processing") for frequently turning on/off electric conduction to an LED to change a ratio (a duty ratio) of an electric-conduction period to a whole period. In addition, like a conventional example described in document 1, there is also a case of lighting an LED by combining the DC dimming processing and the burst dimming processing.

Incidentally, a switching power supply circuit is normally used in a lighting circuit for lighting the LED. Then, in the burst dimming processing, the electric-conduction period, during which the switching power supply circuit performs a switching operation, more decreases as a dimming level more decreases. On the other hand, even if the lengths of the electric-conduction periods are same, regarding the number of times for the switching operation, dispersion is generated among the electric-conduction periods. The switching operation is performed by the switching power supply circuit during the electric-conduction period. Therefore, the light intensity of the light source is also changed due to the dispersion. In a case where the electric-conduction period is comparatively long, that is, in a case where brightness instructed by the dimming level is comparatively high, because the changing of the light intensity caused by the dispersion of the number of times for the operation is not recognized by a user, there is hardly problem.

However, in a case where the electric-conduction period is comparatively short, that is, in a case where the brightness instructed by the dimming level is comparatively low, the changing of the light intensity caused by the dispersion of the number of times for the operation is easily recognized by a user as a flicker.

SUMMARY OF THE INVENTION

The present invention has been made in the light of the above-mentioned problem, and it is an object thereof to be capable of lighting a light source part at a lower dimming level while suppressing a flicker.

A lighting device according to an aspect of the present invention includes a power converter and a controller. The power converter is configured to convert input power into DC power to be supplied to a light source part comprising a solid light emitting element. The controller is configured to operate the power converter only during an operation period that is not longer than a prescribed burst time cycle. The burst time cycle is repeated. The controller is configured to expand/contract a ratio of the operation period to the burst time cycle. The power converter includes an inductor and a switching element. The inductor is coupled to the light source part in series. The switching element is coupled to the inductor in series. The controller includes a driving part and a trigger-signal-output part. The driving part is configured to output a driving signal to turn on the switching element. The trigger-signal-output part is configured to output a trigger signal to the driving part. The driving part is configured to output the driving signal when receiving the trigger signal. The driving part is configured to stop outputting the driving signal when a current flowing through the inductor and the switching element reaches a prescribed value. The trigger-signal-output part is configured to set the burst time cycle to a time period that is N times as long as a constant first cycle. N is an integer of two or more. The trigger-signal-output part is configured to output the trigger signal M times during the operation period so as to synchronize the trigger signal with the first cycle. M is a positive integer of N or less. The trigger-signal-output part is configured not to output the trigger signal during a stop period except the operation period of the burst time cycle.

A lighting device according to another aspect of the present invention includes a power converter and a controller. The power converter is configured to convert input power into DC power to be supplied to a light source part comprising a solid light emitting element. The controller is configured to operate the power converter only during an operation period that is not longer than a prescribed burst time cycle. The burst time cycle is repeated. The controller is configured to expand/contract a ratio of the operation period to the burst time cycle. The power converter includes an inductor and a switching element. The inductor is coupled to the light source part in series. The switching element is coupled to the inductor in series. The controller includes a driving part and a trigger-signal-output part. The driving part is configured to output a driving signal to turn on the switching element. The trigger-signal-output part is configured to output a trigger signal to the driving part. The driving part is configured to output the driving signal when receiving the trigger signal. The driving part is configured to stop outputting the driving signal when a current flowing through the inductor and the switching element reaches a prescribed value. The trigger-signal-output part is configured to set the burst time cycle to a time period that is N times as long as an output cycle of the trigger signal in the operation period. N is an integer of two or more. The trigger-signal-output part is configured to set the operation period to a time period that is M times as long as the output cycle. M is a positive integer of N or less. The trigger-signal-output part is configured to set a stop period except the operation period of the burst time cycle to a time period generated by multiplying the output cycle by a difference between N and M.

In the lighting device according to the aspect of the present invention, the trigger-signal-output part is configured to set the burst time cycle to the time period that is N times as long as the constant first cycle. N is the integer of two or more. The trigger-signal-output part is configured to output the trigger signal M times during the operation period so as to synchronize the trigger signal with the first cycle. M is the positive integer of N or less. The trigger-signal-output part is configured to stop outputting the trigger signal during the stop period except the operation period of the burst time cycle. Alternatively, in the lighting device according to the other aspect of the present invention, the trigger-signal-output part is configured to set the burst time cycle to the time period that is N times as long as the output cycle of the trigger signal in the operation period. N is the integer of two or more. The trigger-signal-output part is configured to set the operation period to the time period that is M times as long as the output cycle. M is the positive integer of N or less. The trigger-signal-output part is configured to set the stop period except the operation period of the burst time cycle to the time period generated by multiplying the output cycle by the difference between N and M. Accordingly, it is an effect thereof to be capable of lighting the light source part at the lower dimming level while suppressing dispersion of light intensity.

BRIEF DESCRIPTION OF THE DRAWINGS

The figures depict one or more implementations in accordance with the present teaching, by way of example only, not by way of limitations. In the figures, like reference numerals refer to the same or similar elements.

FIG. 5 is an operation waveform chart for describing the operation of the comparative example.

DETAILED DESCRIPTION

The following describes a lighting device, in which a light emitting diode is used as a light source, according to an embodiment in detail with reference to FIGS. 1 to 5. A solid light emitting element that is capable of lighting with the lighting device according to the present embodiment is not limited to the light emitting diode, and may be other solid light emitting element, such as an electro luminescence element.

Figure 2:
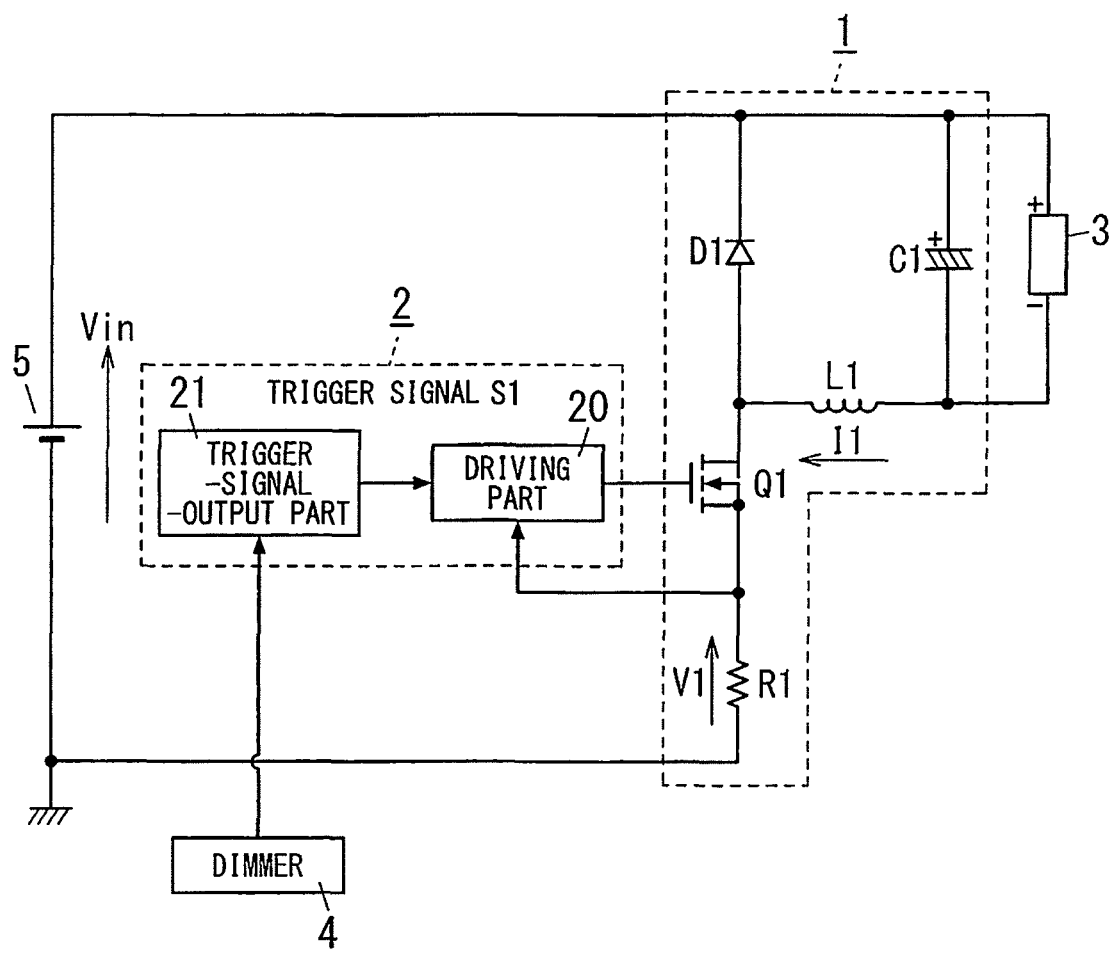
FIG. 2 is a circuit block diagram illustrating the lighting device according to the embodiment.

As shown in FIG. 2, the lighting device according to the present embodiment includes a power converter 1 and a controller 2. The power converter 1 is configured to convert (for example, decrease) an input voltage Vin, which is inputted from a DC power supply 5, into a voltage, which is capable of being applied to a light source part 3. The controller 2 is configured to control the power converter 1. The DC power supply 5 includes a power conversion circuit (an AC/DC converter) that is configured to convert, into DC power, AC power provided from a commercial power grid.

The light source part 3 includes a series circuit or a plurality of series circuits. The series circuit is formed so that a plurality of light emitting diodes (not shown) are coupled with each other in series. The plurality of series circuits are formed so as to be coupled with each other in parallel. Each of the plurality of series circuits is formed so that a plurality of light emitting diodes are coupled with each other in series. When all of the plurality of light emitting diodes have the same forward voltages, a rated voltage for the light source part 3 is equal to a voltage that is determined by multiplying the forward voltage across each light emitting diode by the number of the light emitting diodes coupled in series.

The power converter 1 is constituted of a non-insulated back converter that is well known conventionally. The power converter 1 includes a switching element Q1, an inductor L1, a diode D1, a smoothing capacitor C1, and a detection resistor R1. The switching element Q1 includes a field effect transistor.

A drain terminal of the switching element Q1 is coupled to an anode of the diode D1 and one end (a first end) of the inductor L1. A source terminal of the switching element Q1 is coupled to one end (a first end) of the detection resistor R1. The other end (a second end) of the inductor L1 is coupled to one end (a first end) of the smoothing capacitor C1 and one end (a cathode of the light emitting diode) of the light source part 3. The one end of the smoothing capacitor C1 is provided on a side of a low electrical potential. A cathode of the diode D1 is coupled to the other end (a second end) of the smoothing capacitor C1 and the other end (an anode of the light emitting diode) of the light source part 3. The other end of the smoothing capacitor C1 is provided on a side of a high electrical potential. The DC power supply 5 is coupled between the cathode of the diode D1 and the other end (a second end) of the detection resistor R1. The input voltage Vin is applied to the power converter 1. The detection resistor R1 is provided to detect a current (hereinafter referred to as an "inductor current") flowing through the inductor L1 and the switching element Q1 in an ON period of the switching element Q1. The circuit configuration of the power converter 1 is one example. The power converter 1 may have another circuit configuration if another circuit configuration includes a switching power supply circuit that can convert (decrease or increase) the input voltage Vin into a voltage that is substantially same as the rated voltage for the light source part 3.

The controller 2 includes a driving part 20 and a trigger-signal-output part 21. The driving part 20 is configured to output a driving signal, which is a rectangular wave signal, to turn on the switching element Q1. The trigger-signal-output part 21 is configured to output a trigger signal, which is a rectangular wave signal, to the driving part 20.

Figure 1:
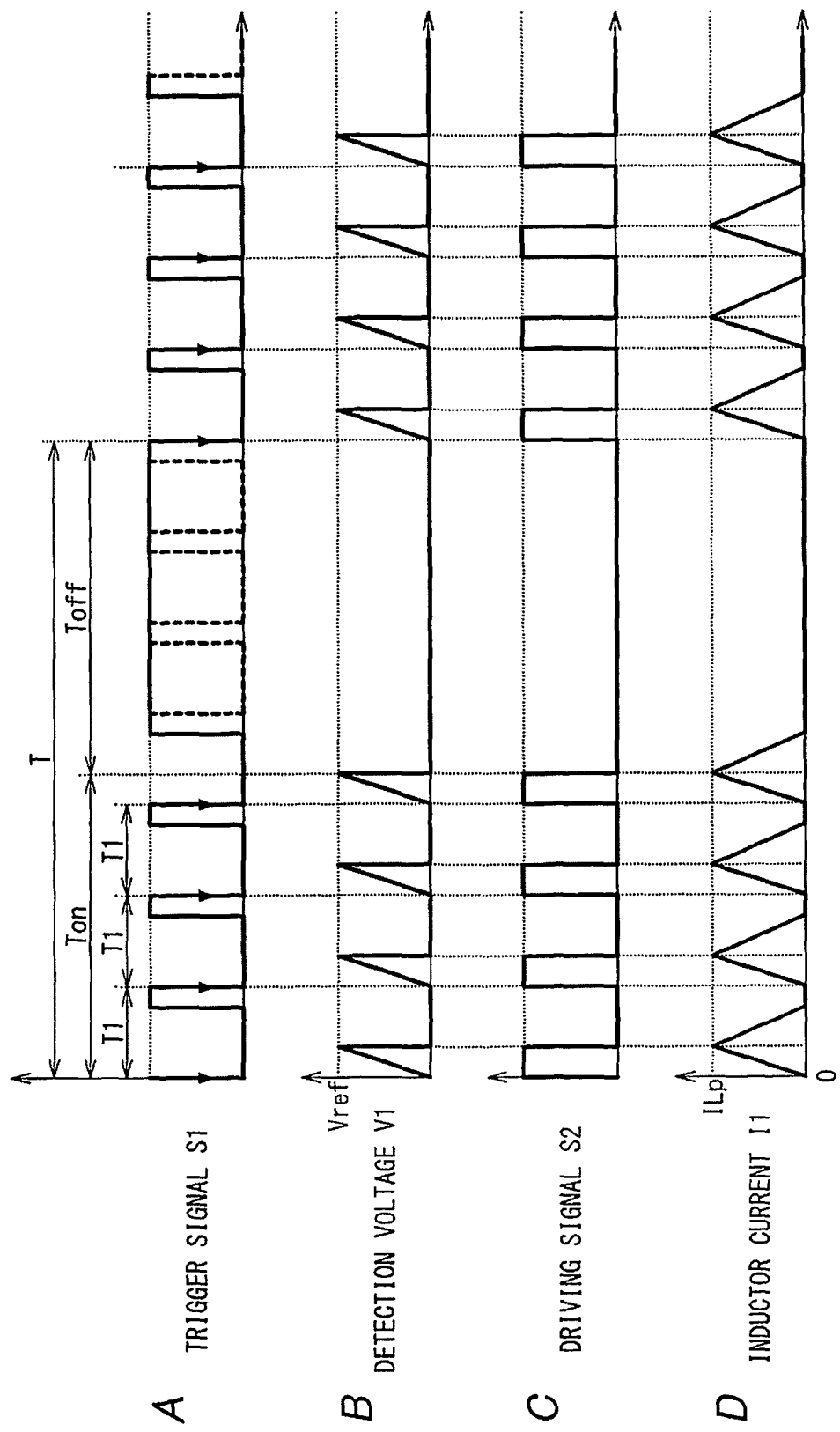
FIG. 1 is an operation waveform chart for describing an operation of a lighting device according to an embodiment.

FIG. 1 shows a voltage and a current of each part according to the present embodiment. Specifically, "A" of FIG. 1 shows trigger signals S1 output from the trigger-signal-output part 21. "B" of FIG. 1 shows a voltage V1 (a detection voltage) across the detection resistor R1. "C" of FIG. 1 shows driving signals S2 that are output (applied) from the driving part 20 between a gate terminal and the source terminal of the switching element Q1. "D" of FIG. 1 shows an inductor current I1 flowing through the inductor L1.

As shown in "A" and "C" of FIG. 1, the driving part 20 is configured to output a driving signal S2 (rise a signal level at a high level) while synchronizing to trailing edge of a trigger signal S1. The switching element Q1 is configured to be turned on when the driving signal S2 is applied to the gate terminal of the switching element Q1. When the switching element Q1 is turned on, the current (the inductor current I1) flows through the smoothing capacitor C1, the light source part 3, the inductor L1, and the switching element Q1 in turn.

The inductor current I1 increases lineally as shown in "D" of FIG. 1. Then, the detection voltage V1 also more increases lineally as the inductor current I1 more increases (see "B" of FIG. 1). When the detection voltage V1 reaches a threshold Vref, the driving part 20 is configured to determine that the inductor current I1 reaches a prescribed value (a prescribed peak value) ILp. Then, the driving part 20 is configured to stop outputting the driving signal S2 (fall the driving signal S2 at a low level). When outputting of the driving signal S2 is stopped, the switching element Q1 is turned off. When the switching element Q1 is turned off, a regenerative current (the inductor current) continues to flow through the inductor L1, the diode D1, and the smoothing capacitor C1 in turn until the whole energy stored in the inductor L1 is released. The driving part 20 is configured to output the driving signal S2 so as to synchronize the driving signal S2 with the trailing edge of the trigger signal S1 to turn off the switching element Q1. The trigger signal S1 is output so as to be synchronized with a constant cycle (a first cycle T1).

The trigger-signal-output part 21 is configured to generate the rectangular wave signal for each first cycle T1. The trigger-signal-output part 21 is configured to output, to the driving part 20, the generated rectangular wave signal as the trigger signal S1 during an operation period Ton. The trigger-signal-output part 21 is configured to output, to the driving part 20, a high level signal instead of outputting the trigger signal S1 during a stop period Toff (see "A" of FIG. 1). That is, the lighting device according to the present embodiment performs dimming with a burst dimming processing described in a background art. Here, the trigger-signal-output part 21 is configured to set a burst time cycle T (=Ton+Toff), which is a sum of the operation period Ton and the stop period Toff, to a time period that is N times as long as the first cycle T1. N is a natural number of two or more. For example, FIG. 1 illustrates an example in a case of N=7.

Figure 3:
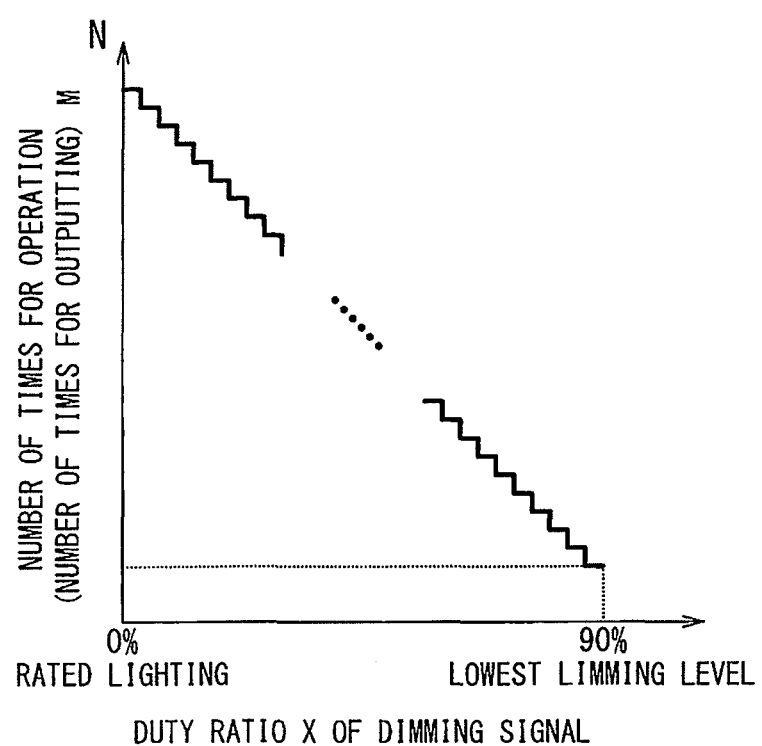
FIG. 3 is an explanatory drawing for describing a relationship between a duty ratio X of a dimming signal and the number of times M for outputting of driving signals in the lighting device according to the embodiment.

The trigger-signal-output part 21 is configured to receive a dimming level from the dimming signal S3 output from a dimmer 4, and then, increase/decrease a ratio (Ton/T) of the operation period Ton to the burst time cycle T depending on the received dimming level. The dimming signal S3 is a rectangular wave signal with a constant frequency (for example, 1 kHz) and expresses the dimming level with the duty ratio thereof. For example, in a rated lighting as shown in FIG. 3, the duty ratio of the dimming signal S3 is 0%. When the dimming level is the lowest (in the lowest dimming level), the duty ratio of the dimming signal S3 is 90%.

The trigger-signal-output part 21 is configured to measure a duty ratio X ($0<=X<=90$) of the dimming signal S3, and, calculate a value (90/N) by dividing a dimming range (90%) by N, and then, calculate a quotient (a quotient of integers) by divided the duty ratio X by the value (90/N), and then, calculate a value M ($=N-X/(90/N)$) by subtracting the quotient from N.

For example, in a case of N=7, M is 1 when the duty ratio X is a range of $6\times(90/7)<=X<7\times(90/7)$. M is 2 when the duty ratio X is a range of $5\times(90/7)<=X<6\times(90/7)$. M is 3 when the duty ratio X is a range of $4\times(90/7)<=X<5\times(90/7)$. M is 4 when the duty ratio X is a range of $3\times(90/7)<=X<4\times(90/7)$. M is 5 when the duty ratio X is a range of $2\times(90/7)<=X<3\times(90/7)$. M is 6 when the duty ratio X is a range of $90/7<=X<2\times(90/7)$. M is 7 when the duty ratio X is a range of $0<=X<90/7$.

Here, the integer M corresponds to the number of times for the operation of the switching element Q1 in the operation period Ton of the burst time cycle T (the number of times for outputting of the driving signal S2). That is, in the rated lighting, M is equal to N, and the stop period Toff is zero. The number of times M for the operation (the number of times for outputting) more decreases in steps as the dimming level more decreases (the duty ratio X more increases) (see FIG. 3). For example, when the duty ratio X of the dimming signal S3 is 45%, because 90/7 is equal to about 12.9, 45/12.9 is equal to 3 with a remainder of 6.3, and then, M is 4 (=7−3).

Then, after the trigger-signal-output part 21 has output the trigger signals S1 to the driving part 20 by the number of times that is equal to the number of times M for the operation (four times in "A" of FIG. 1) while is synchronized with a start of the burst time cycle T, the trigger-signal-output part 21 outputs the high level signal from a leading edge of the next rectangular wave signal to an end of the burst time cycle T. Then, the driving part 20 outputs the driving signal S2 so as to synchronize the driving signal S2 with the trailing edge of the trigger signal S1 (see "C" of FIG. 1) to turn on the switching element Q1 (see "D" of FIG. 1).

Here, as a comparative example, it is assumed that a trigger-signal-output part (correspond to the trigger-signal-output part 21 of the present embodiment) outputs a trigger signal S11 to a driving part (correspond to the driving part 20 of the present embodiment) and a burst-dimming-signal-output part, which is not shown, outputs a burst dimming signal S14 to the driving part. The burst dimming signal S14 includes a rectangular wave signal having a time period that is equal to a time period of a dimming signal (correspond to the dimming signal S3 of the present embodiment). When a duty ratio of the dimming signal is 0% (in a rated lighting), the burst-dimming-signal-output part sets a duty ratio of the burst dimming signal S14 to 100%. When the duty ratio of the dimming signal is 90% (in the lowest dimming level), the burst-dimming-signal-output part sets the duty ratio of the burst dimming signal S14 to 10%. The burst-dimming-signal-output part outputs the burst dimming signal S14 without synchronizing the burst dimming signal S14 with the trigger signal S11 that the trigger-signal-output part outputs.

Figure 4:
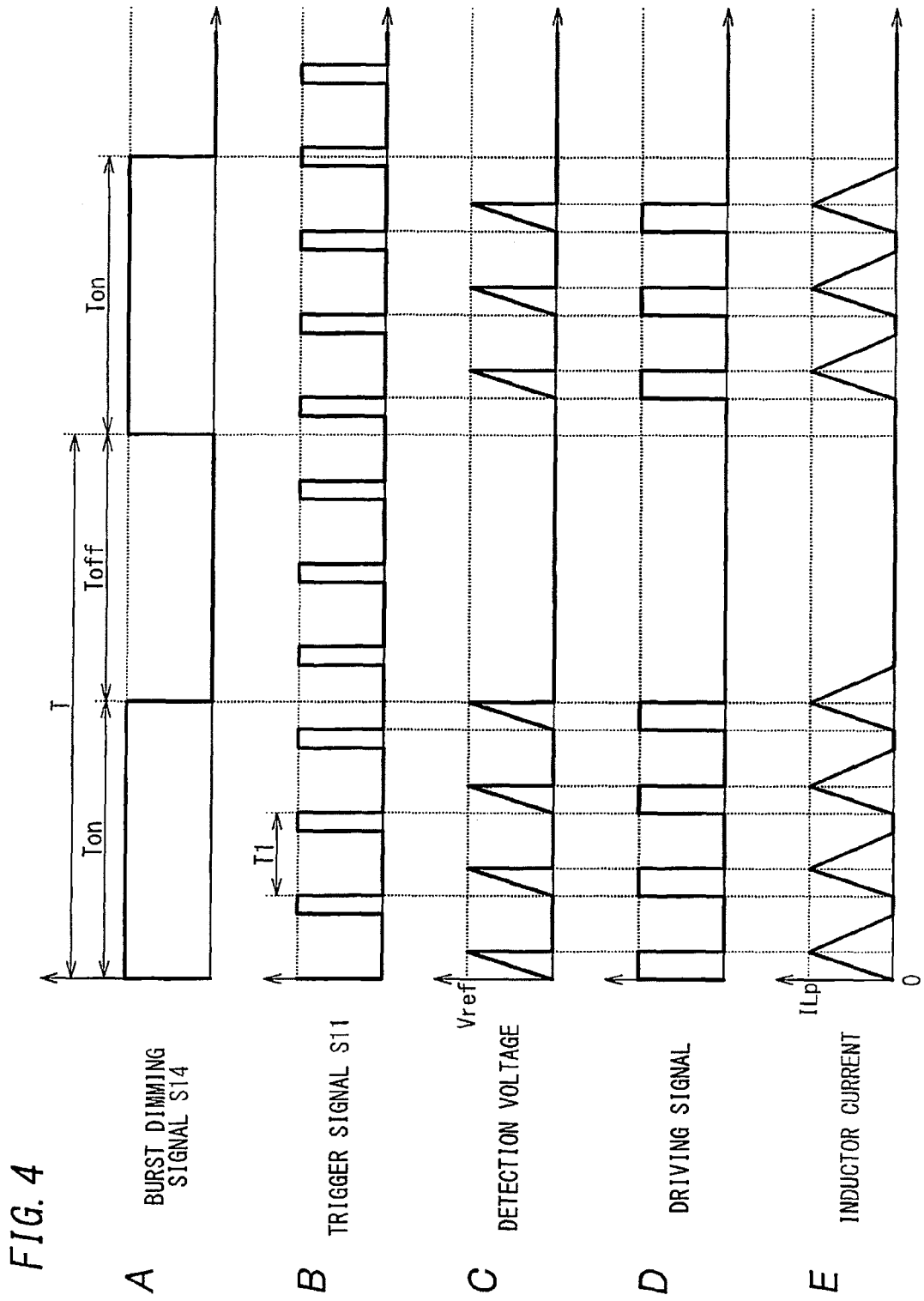
FIG. 4 is an operation waveform chart for describing an operation of a comparative example.

In the above-mentioned comparative example, as shown in FIG. 4, even if the duty ratio of the dimming signals is same, dispersion of the number of times for an operation of a switching element (correspond to the switching element Q1 of the present embodiment) is generated among operation periods Ton (four times and three times in the illustrated example, for example, the number of times for the operation in a first operation period Ton is different from the number of times for the operation in a second operation period Ton). Alternatively, as shown in FIG. 5, even if the number of times for the operation is same, there is a fear that an ON time period of the switching element is decreased. Then, changing of light intensity, which is caused by the dispersion of the number of times for the operation and reducing of the ON time period, is easily recognized by a user as a flicker.

On the other hand, in the present embodiment, instead of the burst-dimming-signal-output part outputting the burst dimming signal S14 to the driving part 20, the trigger-signal-output part 21 increases/decreases the number of times M for the operation of the switching element Q1 depending on the dimming level (the duty ratio X of the dimming signal S3) for each burst time cycle T. As a result, as shown in FIG. 1, if the duty ratio X of the dimming signals S3 is within the same range, because the number of times M for the operation in the burst time cycle T (the operation period Ton) is constantly same and unchanged (for example, the number of times M for the operation in the first burst time cycle T is same as the number of times M for the operation in the second burst cycle T), it is possible to suppress the flicker without changing the light intensity.

As described above, the lighting device according to the present embodiment includes the power converter 1. The power converter 1 is configured to convert input power into DC power to be supplied to the light source part 3 including the solid light emitting element. The lighting device according to the present embodiment further includes the controller 2. The controller 2 is configured to operate the power converter 1 only during the operation period Ton that is not longer than the prescribed burst time cycle T. The burst time cycle T is repeated. The controller 2 is configured to expand/contract the ratio (Ton/T) of the operation period Ton to the burst time cycle T. The power converter 1 includes the inductor L1 and the switching element Q1. The inductor L1 is coupled to the light source part 3 in series. The switching element Q1 is coupled to the inductor L1 in series. The controller 2 includes the driving part 20 and the trigger-signal-output part 21. The driving part 20 is configured to output the driving signal S2 to turn on the switching element Q1. The trigger-signal-output part 21 is configured to output the trigger signal S1 to the driving part 20. The driving part 20 is configured to output the driving signal S2 when receiving the trigger signal S1. The driving part 20 is configured to stop outputting the driving signal S2 when the current (the inductor current I1) flowing through the inductor L1 and the switching element Q1 reaches the prescribed value ILp. The trigger-signal-output part 21 is configured to set the burst time cycle T to the time period that is N times as long as the constant first cycle T1. N is the integer of two or more. The trigger-signal-output part 21 is configured to output the trigger signal S1 M times during the operation period Ton so as to synchronize the trigger signal S1 with the first cycle T1. M is the positive integer of N or less. The trigger-signal-output part 21 is configured not to output the trigger signal S1 during the stop period Toff except the operation period Ton of the burst time cycle T.

Alternatively, the trigger-signal-output part 21 of the lighting device according to the present embodiment is configured to set the burst time cycle T to the time period that is N times as long as the output cycle (the first cycle T1) of the trigger signal S1 in the operation period Ton. N is the integer of two or more. Furthermore, the trigger-signal-output part 21 is configured to set the operation period Ton to the time period that is M times as long as the output cycle T1. M is the positive integer of N or less. The trigger-signal-output part 21 is configured to set the stop period Toff except the operation period Ton of the burst time cycle T to the time period generated by multiplying the output cycle T1 by the difference between N and M.

As described above, according to the lighting device of the present embodiment, the trigger-signal-output part 21 is configured to output the trigger signal S1 and a burst dimming signal (514) to the driving part 20 while synchronizing the trigger signal S1 with the burst dimming signal. Therefore, the number of times for the operation of the switching element Q1 is unchanged among the burst time cycles T with the same dimming level. As a result, the lighting device according to the present embodiment can light the light source part 3 at the lower level while suppressing the flicker.

Preferably, the trigger-signal-output part 21 according to the present embodiment is configured to increase/decrease the number of times M for outputting of the trigger signal S1 depending on the dimming level indicating the light intensity of the light source part 3.

Preferably, the driving part 20 according to the present embodiment is configured to output the driving signal S2 at the time when the trigger signal S1 falls from the high level to the low level. Preferably, the trigger-signal-output part 21 is configured to maintain the trigger signal S1 to the high level during the stop period Toff.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:
1. A lighting device comprising:
a power converter configured to convert input power into DC power to be supplied to a light source part comprising a solid light emitting element; and
a controller configured to operate the power converter only during an operation period that is not longer than a prescribed burst time cycle, the burst time cycle being repeated, the controller being configured to expand/contract a ratio of the operation period to the burst time cycle,
wherein the power converter comprises:
an inductor coupled to the light source part in series; and
a switching element coupled to the inductor in series,
wherein the controller comprises:
a driving part configured to output a driving signal to turn on the switching element; and
a trigger-signal-output part configured to output a trigger signal to the driving part,
wherein the driving part is configured to output the driving signal when receiving the trigger signal,
the driving part being configured to stop outputting the driving signal when a current flowing through the inductor and the switching element reaches a prescribed value such that the current flowing through the inductor decreases to zero during the operation period, and
wherein the trigger-signal-output part is configured to set the burst time cycle to a time period that is N times as long as a constant first cycle, N being an integer of two or more,
the trigger-signal-output part being configured to output the trigger signal M times during the operation period so as to synchronize the trigger signal with the first cycle, M being a positive integer of N or less, such that the current flowing through the inductor decreases to zero M times during the burst time cycle,
the trigger-signal-output part being configured not to output the trigger signal during a stop period except the operation period of the burst time cycle.
2. The lighting device according to claim 1, wherein the trigger-signal-output part is configured to increase/decrease a number of times M for outputting of the trigger signal depending on a dimming level indicating light intensity of the light source part.
3. The lighting device according to claim 2,
wherein the driving part is configured to output the driving signal at a time when the trigger signal falls from a high level to a low level, and
wherein the trigger-signal-output part is configured to maintain the trigger signal to the high level during the stop period.

4. The lighting device according to claim 1,
wherein the driving part is configured to output the driving signal at a time when the trigger signal falls from a high level to a low level, and
wherein the trigger-signal-output part is configured to maintain the trigger signal to the high level during the stop period.

5. A lighting device comprising:
a power converter configured to convert input power into DC power to be supplied to a light source part comprising a solid light emitting element; and
a controller configured to operate the power converter only during an operation period that is not longer than a prescribed burst time cycle, the burst time cycle being repeated, the controller being configured to expand/contract a ratio of the operation period to the burst time cycle,
wherein the power converter comprises:
an inductor coupled to the light source part in series; and
a switching element coupled to the inductor in series,
wherein the controller comprises:
a driving part configured to output a driving signal to turn on the switching element; and
a trigger-signal-output part configured to output a trigger signal to the driving part,
wherein the driving part is configured to output the driving signal when receiving the trigger signal,
the driving part being configured to stop outputting the driving signal when a current flowing through the inductor and the switching element reaches a prescribed value such that the current flowing through the inductor decreases to zero during the operation period, and
wherein the trigger-signal-output part is configured to set the burst time cycle to a time period that is N times as long as an output cycle of the trigger signal in the operation period, N being an integer of two or more,
the trigger-signal-output part being configured to set the operation period to a time period that is M times as long as the output cycle, M being a positive integer of N or less, such that the current flowing through the inductor decreases to zero M times during the burst time cycle,
the trigger-signal-output part being configured to set a stop period except the operation period of the burst time cycle to a time period generated by multiplying the output cycle by a difference between N and M.

\* \* \* \* \*